Patented Jan. 31, 1928.

1,657,809

UNITED STATES PATENT OFFICE.

ANDRÉ WAHL, OF ENGHIEN, AND ROBERT LANTZ, OF PARIS, FRANCE, ASSIGNORS OF ONE-HALF TO SOCIETE ANONYME DES MATIERES COLORANTES ET PRODUITS CHIMIQUES DE SAINT-DENIS, OF PARIS, FRANCE.

PROCESS FOR THE PREPARATION OF NEW DERIVATIVES OF NAPHTHOQUINONE.

No Drawing. Original application filed December 21, 1922, Serial No. 608,334, and in Germany December 28, 1921. Divided and this application filed July 12, 1924. Serial No. 725,669.

In their application for a U. S. patent Serial No. 608,334 filed December 21, 1922, of which the present specification is a divisional application, the applicants have described a process of preparing 1 arylimino-2-naphthoquinones.

The 1 arylimino-2-naphthoquinones are very reactive which is common to quinonic molecules. Thus, for instance, they have the power to add the alkali metal sulphites and bisulphites in order to give sulphonated compounds which form themselves apparently according to the following reaction:

R is the aryl radical.

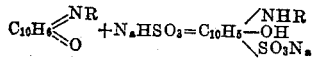

These new sulphonic acids form crystals which are slightly coloured gray, little soluble in water, soluble in the alkaline bodies with which they form salts.

The following examples will serve to show these different transformations, but it is obvious that the conditions under which they can take place can be largely modified.

*Example 1. Sulphonic acid of an hydroxy-arylamino-naphthalene.*—A mixture of 40 grs. of 1-phenylimino-2-naphthoquinone, freshly prepared and pressed, and 55 cc. of a solution of bisulphite of sodium of 36° Bé., are triturated in a mortar, at the ordinary temperature. The green coloration of the phenylimino-naphthoquinone disappears by and by and there is formed a gray crystalline precipitate. When the reaction is complete, the operation is repeated with a concentrated solution of carbonate of sodium, filtered and acidified by a mineral acid. The product of the reaction is precipitated in the form of small gray crystals which can be re-crystallized in dilute alcohol containing hydrochloric acid.

The reaction is as follows:

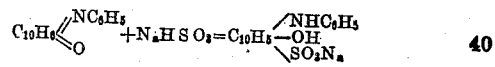

for the free acid, the analysis gives the following figures:

|   | Found | Calculated for $C_{16}H_{13}O_4NS$ |
|---|---|---|
| N% | 4,2 | 4,4 |
| S% | 10,37 | 10,16 |

The free acid forms colourless crystals, little soluble in water; its sodium salt is very soluble and its solutions have a very great green fluorescence.

By substituting for the 1-phenylimino-2-naphthoquinone, its homologous or its direct derivatives, a similar reaction can be obtained.

What we claim is:

1. A process of preparing sulphonic acids of 1-arylimino-2-hydroxy-naphthalene which consists in treating the 1-arylimino-2-naphthoquinones with soluble salts of sulphurous acid.

2. A process of preparing sulphonic acids of 1-arylimino-2-hydroxy-naphthalene which consists in treating the 1-arylimino-2-naphthoquinones with neutral soluble salts of sulphurous acid.

3. As new products, the sulphonic acids of 1-arylimino-2-hydroxy-naphthalene.

In testimony whereof we have signed this specification.

ANDRÉ WAHL.
ROBERT LANTZ.